No. 829,359. PATENTED AUG. 21, 1906.
C. R. WEIDMÜLLER.
BUTTON FOR GLOVES.
APPLICATION FILED JUNE 2, 1905.
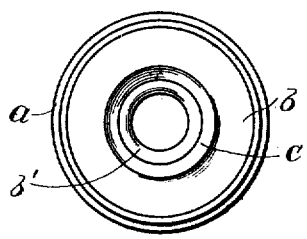
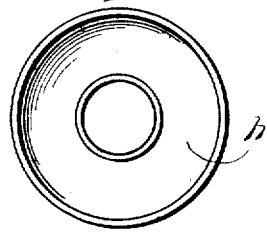
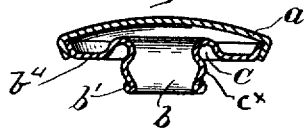
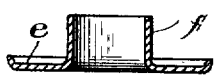
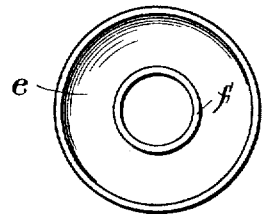
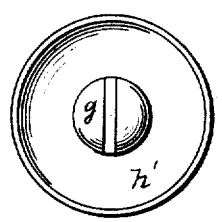
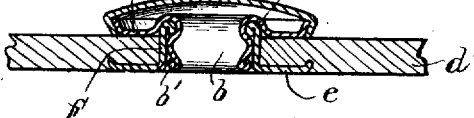
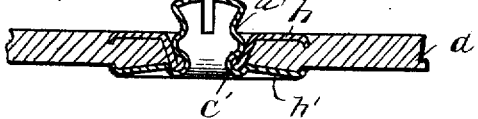
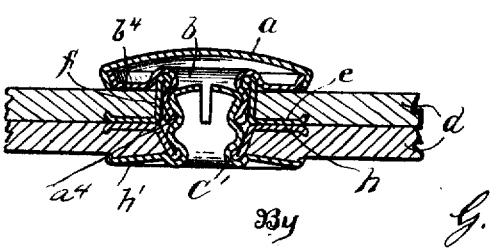
Witnesses
J. P. Britt
Geo. Heinicke
Inventor
Carl Robert Weidmüller
By G. Dittmar
Attorneys

UNITED STATES PATENT OFFICE.

CARL ROBERT WEIDMÜLLER, OF CHEMNITZ, GERMANY.

BUTTON FOR GLOVES.

No. 829,359.     Specification of Letters Patent.     Patented Aug. 21, 1906.

Application filed June 2, 1905. Serial No. 263,393.

*To all whom it may concern:*

Be it known that I, CARL ROBERT WEIDMÜLLER, a subject of the King of Saxony and the Emperor of Germany, and a resident of the city of Chemnitz, Saxony, in the German Empire, have invented certain new and useful Improvements in Buttons for Gloves, of which the following is a full, clear, and exact specification.

The object of the present invention is a separable button for gloves and the like composed of two well-known members, one forming a socket member and the other a stud member.

The improvement consists principally in a shape of the socket or socket part of the socket member exactly corresponding to the shape of the upper part of the resilient stud-piece, so that after closing the parts they remain steadily together till they are separated by a strong pull.

In the accompanying drawings, forming part of this specification, Figure 1 shows a plan view of a part of the socket member. Fig. 2 is a cross-section thereof. Fig. 3 shows in cross-section the eyelet. Fig. 4 is a plan view of the same. Fig. 5 is a section of the complete socket member secured to the fabric. Figs. 6 and 7 show in plan view and section an eyelet similar to Fig. 3 for securing the fabric to the stud-piece. Fig. 8 shows the stud-piece in cross-section. Fig. 9 shows the same in plan view. Fig. 10 is a cross-section through the stud-piece united with its eyelet and clamping the fabric. Fig. 11 shows in cross-section the completed socket member and stud member in operative connection.

$a$ is the cap or top plate of the socket member of any suitable material, and $b$ is the socket part. The socket part $b$ is converging or conical at the mouth or socket-entrance and has the exact inner shape as the resilient stud-piece on the outside, so that the latter snugly fits in the socket part and is in contact with the same at all parts of its interior. The lower edge $b'$ of the socket part is preferably doubled or rolled, as shown in Figs. 2 and 5, to strengthen the edge and prevent any deformation by long and repeated use. At the union or junction of the socket and the flange $b^4$ of the socket part the metal is spun out, so as to form a deep annular and rounded external or exterior groove $c$, Figs. 2 and 5. The socket portion $b$ is formed with an exterior annular ridge $c^\times$, as seen in the different views, which ridge is disposed between the groove $c$ and the end or mouth of the socket portion.

The eyelet, Figs. 3 and 4, has the usual form of a short sleeve $f$, with a broad flange $e$, which binds the fabric and clamps it against the flange $b^4$ of the socket part when suitable pressure is applied in the well-known manner, thereby rolling the edge of the sleeve $f$ inwardly, as shown in Fig. 5, and firmly uniting the eyelet and the socket on the fabric.

The groove $c$ acts as an anvil and guides the metal inwardly, as is well known. However, the rounded shape of the groove produces a curling of the edge, and thereby a much better and more resistant union is effected. $g$ is a slitted stud, as seen in Fig. 8. There is also a groove $c'$ provided at the union of the stud and its plate or flange, so that the lower edge of the eyelet, Figs. 6 and 7, may be curled around in the groove when pressure is applied to unite the eyelet with the stud-piece and to clamp the fabric $d$ between the flange $h$ and the flange $h'$ of the stud-piece, as shown in Fig. 10.

In closing the button—that is to say, in pushing the stud member, Fig. 10, into the socket member, Fig. 5—a union is obtained, as illustrated by Fig. 11, and it will be seen from this figure that the fabrics come close together and that the head of the stud-piece is well embraced by the socket part. It will be noted that the end of the flanged eyelet is curled within the exterior or annular rounded groove $c'$ in the lower end of the stud member and the end $b'$ of the socket part is engaged in an external groove $a^4$ of the stud-piece between the ends of the latter.

The pull upon the socket part in separating the parts is transferred upon the flange $b^4$ in such a way that the pressure acts directly on the fabric, the eyelet being used only to clamp the fabric between its flange and the flange $b^4$ of the socket member, and thus any danger of tearing apart or separating the parts is avoided. To this end the socket part is formed in one piece with the flange, and the deep rounded annular groove $c$ is formed in the metal at the union of flange and socket part into which the edge of the eyelet is crowded. The stud member is formed in a similar way and on the same principles, the flange $h'$ acting in the same way as the flange $b^4$. It will thus be seen that when the button is pulled apart the strain on the stud-piece, as well as on the socket part is transferred upon integral parts of the metal, which rest on the outer surface of the fabric, and tearing of the parts through the hole in the fabric is prevented.

Having thus described my invention, what I claim is—

A separable button comprising a socket member with cap, a socket part having an exterior annular rounded groove and an exterior annular ridge between said groove and the end of the mouth portion of the socket part, an eyelet with a flange at one end and having its other end curled within said annular rounded groove, and a coöperating stud member having a resilient stud-piece and an annular rounded exterior groove at its base and an exterior annular ridge between said groove and the end of said member, said resilient stud-piece snugly fitted within the socket part, and a flanged eyelet, the end of which is curled within the exterior or annular rounded groove in said stud member, and the end of the socket part engaged in an external groove of the stud-piece between the ends of the latter.

In testimony whereof I affix my signature.

CARL ROBERT WEIDMÜLLER.

In presence of—
MAX RIEDEL,
FREDERICK J. DIETZMAN.